(12) United States Patent
Lu et al.

(10) Patent No.: US 11,588,355 B1
(45) Date of Patent: Feb. 21, 2023

(54) WIRELESS CHARGING MOUSE DEVICE, WIRELESS CHARGING MOUSE, LOWER SHELL OF WIRELESS CHARGING MOUSE, AND METHOD FOR PRODUCING LOWER SHELL

(71) Applicant: DEXIN CORPORATION, New Taipei (TW)

(72) Inventors: Ho-Lung Lu, New Taipei (TW); Chin-Lung Lin, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 0 days.

(21) Appl. No.: 17/706,817

(22) Filed: Mar. 29, 2022

(30) Foreign Application Priority Data

Oct. 22, 2021 (TW) .................................. 110139175

(51) Int. Cl.
*H02J 50/12* (2016.01)
*G06F 3/0354* (2013.01)
*G06F 3/039* (2013.01)

(52) U.S. Cl.
CPC ............ *H02J 50/12* (2016.02); *G06F 3/0395* (2013.01); *G06F 3/03543* (2013.01)

(58) Field of Classification Search
CPC ........... H02J 50/10; H02J 50/005; G06F 1/00; G06F 3/00
See application file for complete search history.

(56) References Cited

U.S. PATENT DOCUMENTS

| 6,633,155 | B1* | 10/2003 | Liang | .................... G06F 3/0395 320/166 |
| 7,106,302 | B2* | 9/2006 | Chen | .................... G06F 1/3259 345/158 |
| 7,119,793 | B2* | 10/2006 | Chen | .................... G06F 3/03543 345/166 |
| 7,187,361 | B2* | 3/2007 | Wang | ..................... G06F 3/038 345/163 |
| 7,397,462 | B2* | 7/2008 | Wu | ..................... G06F 3/03543 345/163 |
| 7,557,798 | B2* | 7/2009 | Huang | ................ G06F 3/03543 345/166 |
| 7,589,496 | B2* | 9/2009 | Chatterjee | ........... G06F 3/03543 710/73 |

(Continued)

*Primary Examiner* — Daniel Cavallari
*Assistant Examiner* — Joseph N Inge
(74) *Attorney, Agent, or Firm* — Li & Cai Intellectual Property (USA) Office

(57) ABSTRACT

A wireless charging mouse device, a wireless charging mouse, a lower shell of the wireless charging mouse, and a method for producing the lower shell are provided. The wireless charging mouse includes an upper shell, a lower shell, and an electronic module located between the upper shell and the lower shell. The lower shell includes an upper board, a lower board, and a wireless charging assembly located between the upper board and the lower board. A side surface of the upper board is fixed to a side surface of the lower board by gluing or melting. The upper board has a connection hole. The wireless charging assembly includes a circuit board and a wireless charging coil. A connection structure of the circuit board is exposed from the upper board by passing through the connection hole, so as to be electrically coupled to the electronic module.

19 Claims, 13 Drawing Sheets

(56) References Cited

U.S. PATENT DOCUMENTS

| | | | |
|---|---|---|---|
| 8,717,296 B2* | 5/2014 | Wu | G06F 3/03543 |
| | | | 361/679.01 |
| 8,963,839 B2* | 2/2015 | Liu | G06F 3/033 |
| | | | 345/163 |
| 2007/0251810 A1* | 11/2007 | Corcoran | G06F 3/03543 |
| | | | 200/276.1 |
| 2013/0113422 A1* | 5/2013 | Lee | H01Q 1/526 |
| | | | 320/108 |
| 2015/0236546 A1* | 8/2015 | Kesler | H02J 50/60 |
| | | | 455/573 |
| 2018/0351389 A1* | 12/2018 | Morier | G06F 3/0383 |

* cited by examiner

WIRELESS CHARGING MOUSE DEVICE, WIRELESS CHARGING MOUSE, LOWER SHELL OF WIRELESS CHARGING MOUSE, AND METHOD FOR PRODUCING LOWER SHELL

CROSS-REFERENCE TO RELATED PATENT APPLICATION

This application claims the benefit of priority to Taiwan Patent Application No. 110139175, filed on Oct. 22, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a mouse, and more particularly to a wireless charging mouse device, a wireless charging mouse, a lower shell of the wireless charging mouse, and a method for producing the lower shell.

BACKGROUND OF THE DISCLOSURE

In a manufacturing process of a conventional wireless charging mouse, a coil circuit board of the conventional wireless charging mouse (i.e., a circuit board used to control a coil) is embedded in a lower shell by plastic injection, so as to prevent the coil circuit board from occupying an internal space of the conventional wireless charging mouse. However, since the coil circuit board cannot withstand high temperature and high pressure, the coil circuit board often deforms or cracks during a plastic injection process. Therefore, a production yield of the conventional wireless charging mouse is inadequate, which results in an increased production cost.

SUMMARY OF THE DISCLOSURE

In response to the above-referenced technical inadequacy, the present disclosure provides a wireless charging mouse device, a wireless charging mouse, a lower shell of the wireless charging mouse, and a method for producing the lower shell, so as to effectively overcome the problem of "a production cost of a conventional wireless charging mouse being too high due to inadequate production yield".

In one aspect, the present disclosure provides a wireless charging mouse. The wireless charging mouse includes an upper shell, an electronic module, and a lower shell. The lower shell is detachably disposed on the upper shell, so that the lower shell and the upper shell jointly form an accommodating space. The electronic module is located in the accommodating space. The lower shell includes an upper board, a lower board, and a wireless charging assembly. The upper board and the lower board each have an installation region and a connection region that surrounds the installation region. A side surface of the upper board located in the connection region thereof is fixed to a side surface of the lower board located in the connection region thereof by gluing or melting, so that a portion of the upper board located in the installation region thereof and a portion of the lower board located in the installation region thereof jointly form an installation space. The upper board is configured to carry the electronic module, and has a connection hole in spatial communication with the installation space and the accommodating space. The wireless charging assembly is disposed in the installation space. The wireless charging assembly includes a circuit board and a wireless charging coil that is electrically coupled to the circuit board. A connection structure of the circuit board is exposed from the upper board by passing through the connection hole, so as to be electrically coupled to the electronic module.

In another aspect, the present disclosure provides a method for producing a lower shell of a wireless charging mouse for being applied a production line. The method includes implementing a first fixing step, an installation step, a cover step, and a second fixing step. The first fixing step includes: fixing a wireless charging coil on a circuit board, so that the wireless charging coil is electrically coupled to the circuit board. The wireless charging coil and the circuit board are jointly defined as a wireless charging assembly. The installation step includes: installing the wireless charging assembly on a lower board. The lower board has an installation region and a connection region that surrounds the installation region, and the wireless charging assembly is located in the installation region of the lower board. The cover step includes: covering the wireless charging assembly with an upper board, so that the wireless charging assembly is located between the upper board and the lower board. The upper board has an installation region and a connection region that surrounds the installation region. The installation region of the upper board corresponds in position to the installation region of the lower board, and the connection region of the upper board corresponds in position to the connection region of the lower board. The upper board has a connection hole corresponding in position to the circuit board. The second fixing step includes: fixing a portion of the upper board located in the connection region thereof and a portion of the lower board located in the connection region thereof by gluing or melting, so that a connection structure of the circuit board is exposed from the upper board by passing through the connection hole.

In yet another aspect, the present disclosure provides a lower shell of a wireless charging mouse produced by the above-mentioned method.

In still another aspect, the present disclosure provides a wireless charging mouse that includes an upper shell, an electronic module, and a lower shell. The lower shell is produced by the above-mentioned method.

In still yet another aspect, the present disclosure provides a wireless charging mouse device. The wireless charging mouse device includes a wireless charging mouse and a wireless charging mouse pad. The wireless charging mouse includes an upper shell, an electronic module, and a lower shell. The lower shell is detachably disposed on the upper shell, so that the lower shell and the upper shell jointly form an accommodating space. The electronic module is located in the accommodating space. The lower shell includes an upper board, a lower board, and a wireless charging assembly. The upper board and the lower board each have an installation region and a connection region that surrounds the installation region. A side surface of the upper board located in the connection region thereof is fixed to a side surface of the lower board located in the connection region thereof by gluing or melting, so that a portion of the upper board located in the installation region thereof and a portion of the lower board located in the installation region thereof jointly form an installation space. The upper board is configured to carry the electronic module, and has a connection hole in spatial communication with the installation space and the accommodating space. The wireless charging assembly is disposed in the installation space. The wireless charging assembly includes a circuit board and a wireless charging coil that is electrically coupled to the circuit board. A connection structure of the circuit board is exposed from the upper board by passing through the connection hole, so as to be electrically coupled to the electronic module. The wireless charging mouse pad is configured to be electromagnetically coupled to the wireless charging mouse, and the wireless charging mouse pad includes a resonance coil. The resonance coil is configured to be electromagnetically coupled to the wireless charging coil, so that the electronic module is configured to be supplied with power through electrical energy that is converted from electromagnetic energy received from the wireless charging coil.

Therefore, in the wireless charging mouse device, the wireless charging mouse, the lower shell of the wireless charging mouse, and the method for producing the lower shell provided by the present disclosure, by virtue of "the side surface of the upper board located in the connection region thereof being fixed to the side surface of the lower board located in the connection region thereof by gluing or melting, so that the portion of the upper board located in the installation region thereof and the portion of the lower board located in the installation region thereof jointly form the installation space" and "the wireless charging assembly being disposed in the installation space and being exposed from the upper board by passing through the connection hole, so as to be electrically coupled to the electronic module," the lower shell is so configured as to allow the production yield to be effectively increased and the production cost to be effectively reduced.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
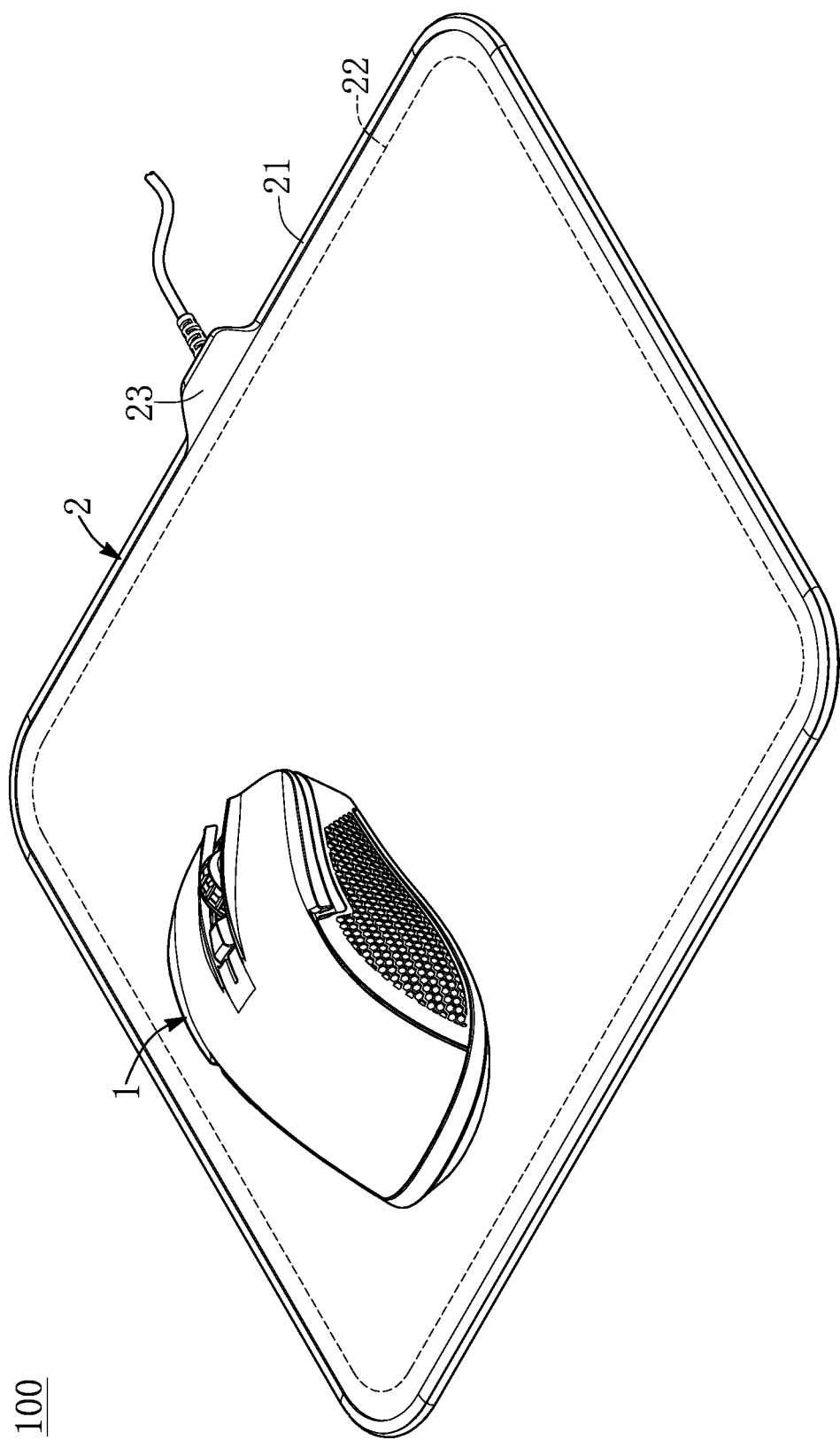
FIG. 1 is a schematic perspective view of a wireless charging mouse device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
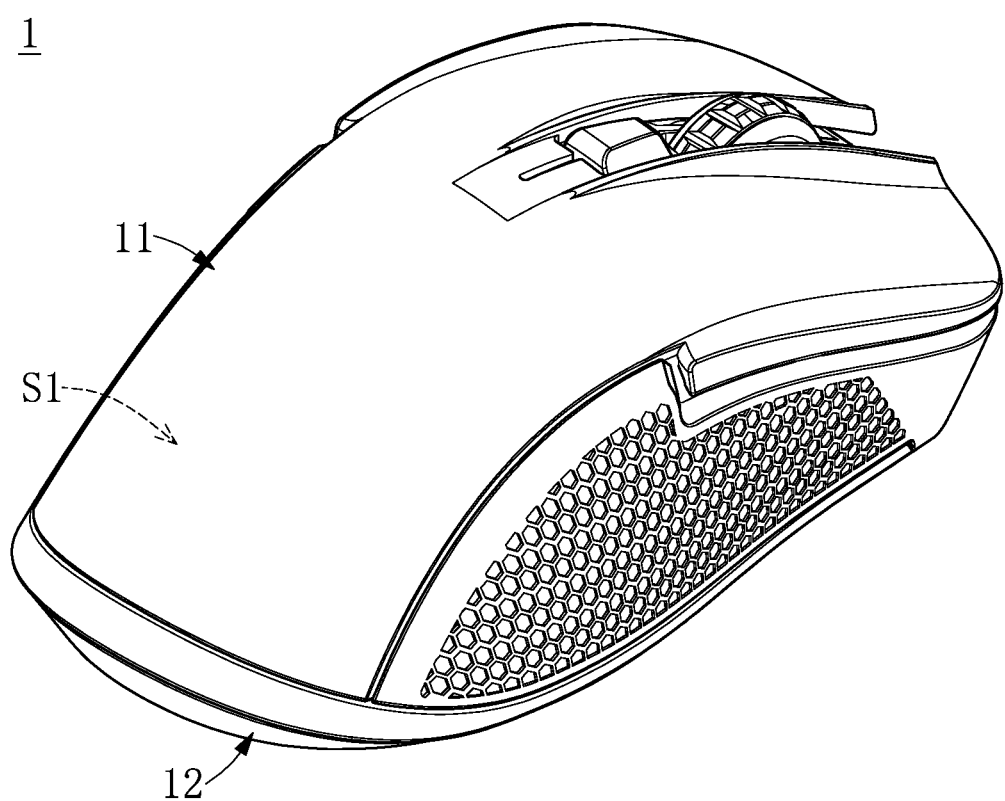
FIG. 2 is a schematic perspective view of a wireless charging mouse according to the first embodiment of the present disclosure.
Figure 3:
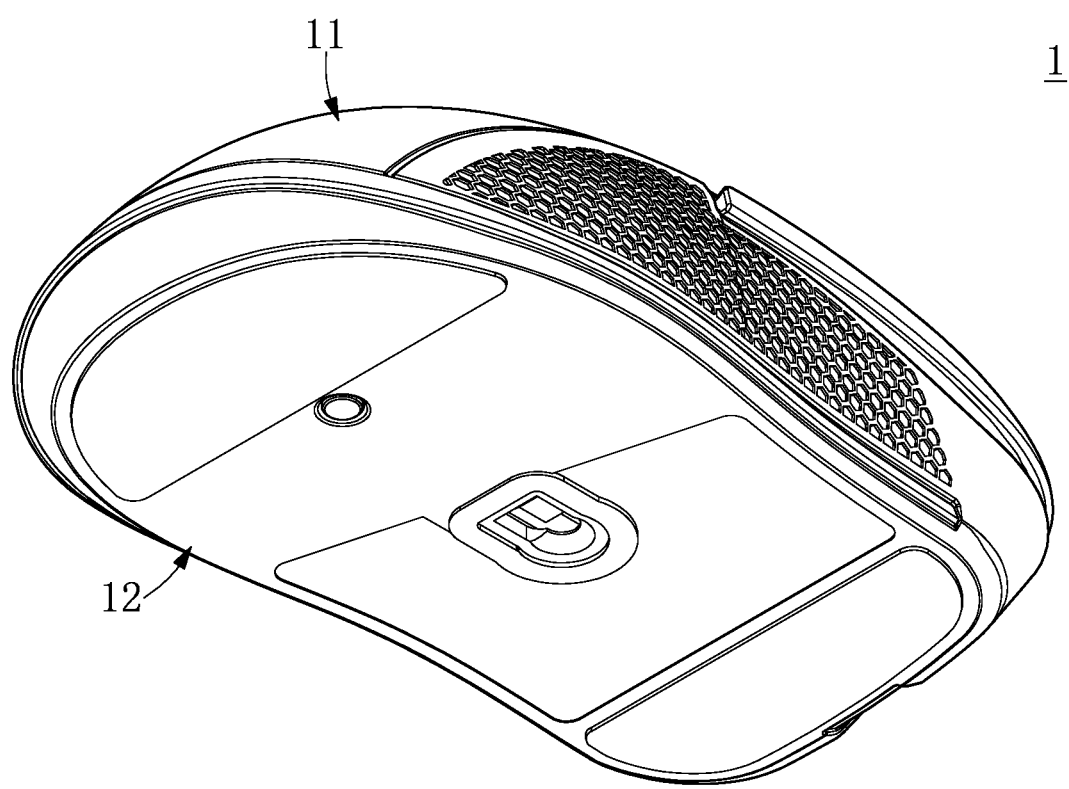
FIG. 3 is another schematic perspective view of the wireless charging mouse according to the first embodiment of the present disclosure.

Referring to FIG. 1 to FIG. 7, a first embodiment of the present disclosure provides a wireless charging mouse device 100. As shown in FIG. 1 to FIG. 3, the wireless charging mouse device 100 includes a wireless charging mouse 1 and a wireless charging mouse pad 2. The wireless charging mouse pad 2 can supply electrical energy to the wireless charging mouse 1 in a wireless manner (e.g., electromagnetic coupling).

It should be noted that the wireless charging mouse 1 and the wireless charging mouse pad 2 in the present embodiment are jointly defined as the wireless charging mouse device 100, but the present disclosure is not limited thereto. For example, the wireless charging mouse 1 can be independently used (e.g., implemented, manufactured, or sold) or can be used in cooperation with other components. The following description describes the structure and connection relationship of each component of the wireless charging mouse device 100.

Figure 5:
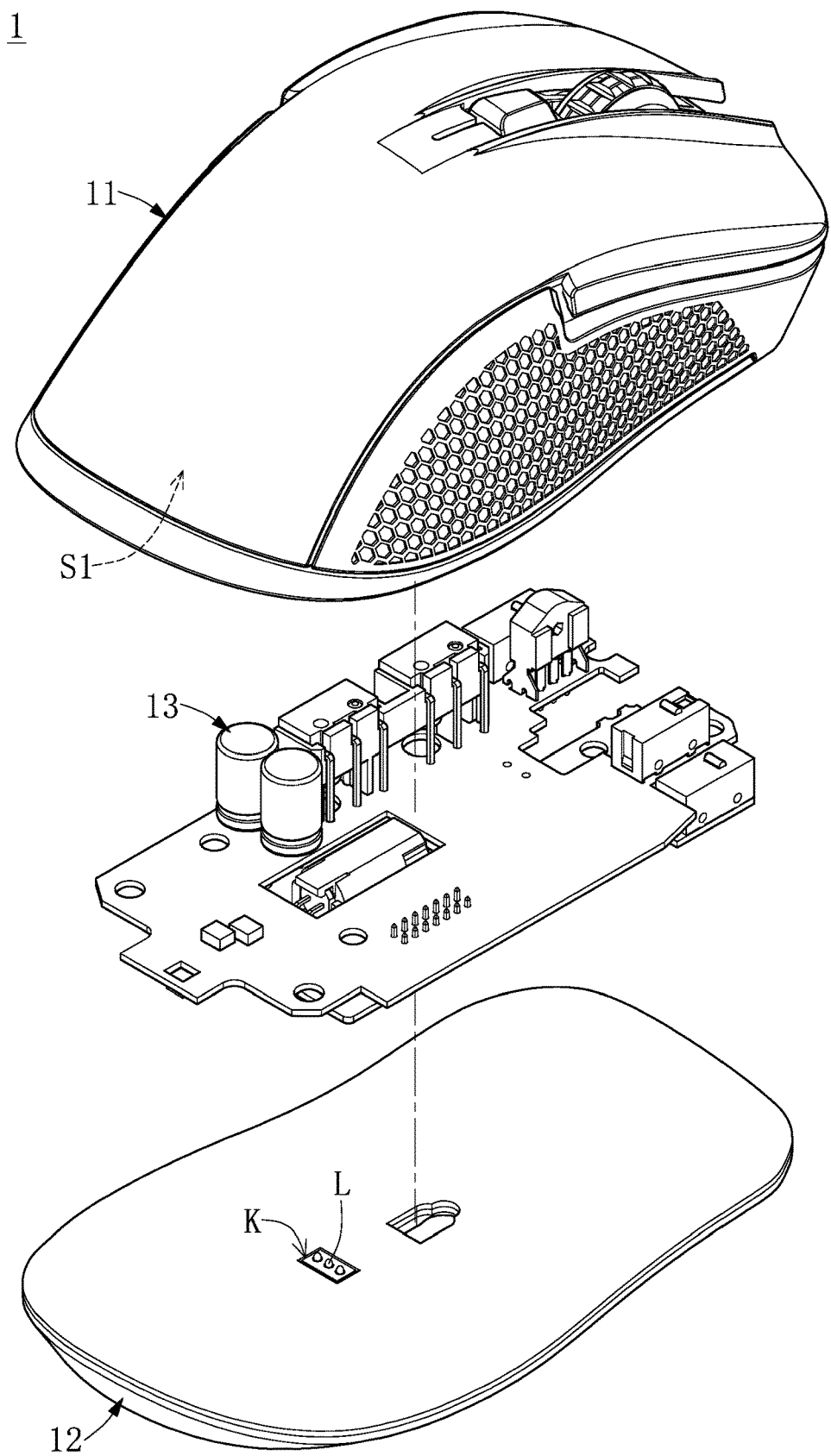
FIG. 5 is a schematic exploded view of the wireless charging mouse according to the first embodiment of the present disclosure.

As shown in FIG. 2, FIG. 3, and FIG. 5, the wireless charging mouse 1 includes an upper shell 11, a lower shell 12 detachably disposed on the upper shell 11, and an electronic module 13 located between the upper shell 11 and the lower shell 12. In addition, it should be noted that the wireless charging mouse 1 in the present embodiment also includes other components, such as a scroll wheel, a plurality of buttons, and others that are required for general operation of a mouse. Since these components are not the focus of the present disclosure, details thereof will not be described herein. Features and characteristics of the present embodiment will be described in more detail below.

Further, the lower shell 12 is detachably disposed on the upper shell 11, and the lower shell 12 and the upper shell 11 can jointly form an accommodating space S1. The accommodating space S1 can be used to accommodate the electronic module 13. In a practical application, the electronic module 13 can be, for example, an optical track sensor, and the optical track sensor can be used to determine a moving direction and a moving distance of the wireless charging mouse 1, so as to locate a cursor. In addition, the upper shell 11 and the lower shell 12 can be fixed by screws, buckles, etc. The upper shell 11 is substantially in an arched structure (e.g., a semi-elliptical shape), and the lower shell 12 is in a plate-like structure.

Figure 6:
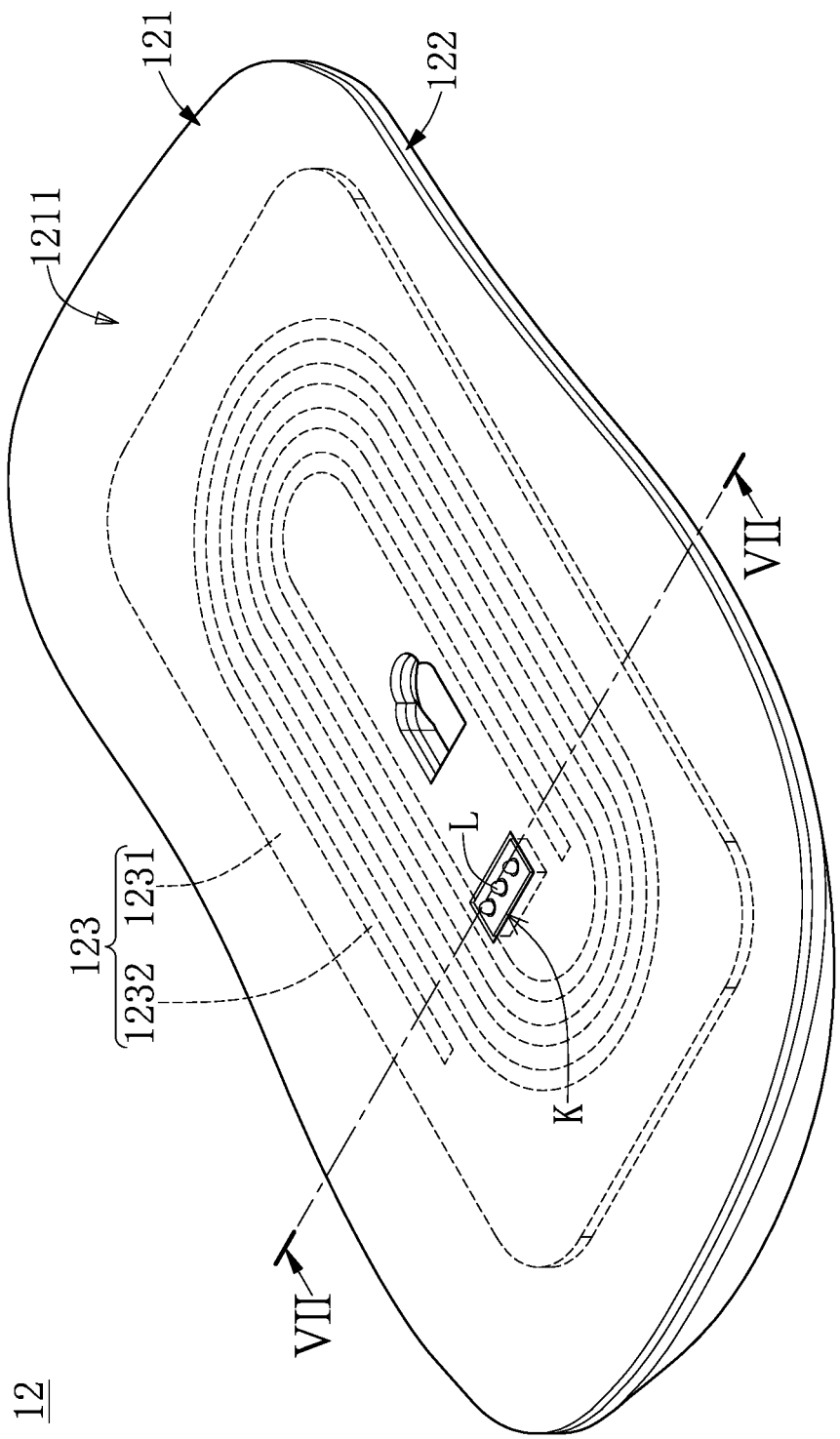
FIG. 6 is a schematic perspective view of a lower shell according to the first embodiment of the present disclosure.
Figure 7:
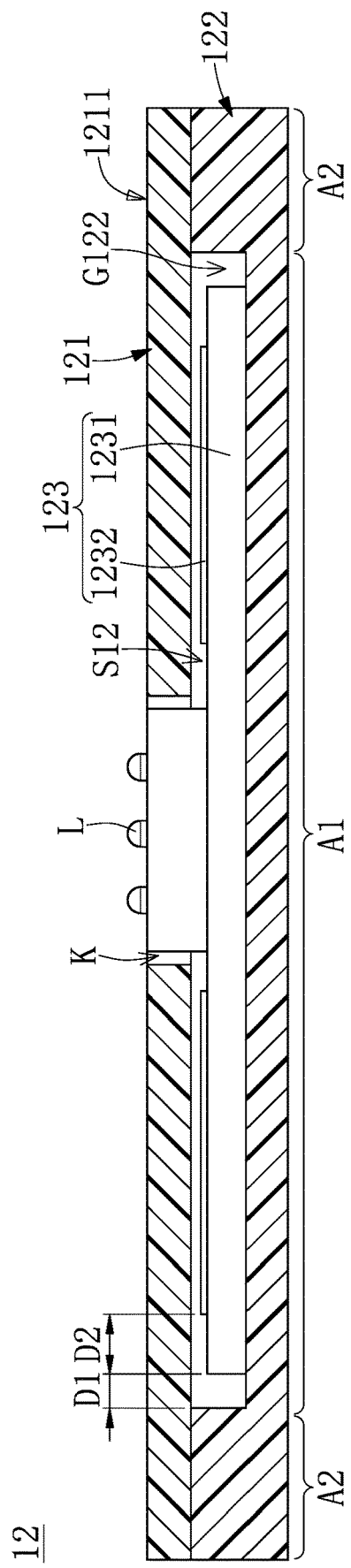
FIG. 7 is a cross-sectional view taken along line VII-VII of FIG. 6.
Figure 9:
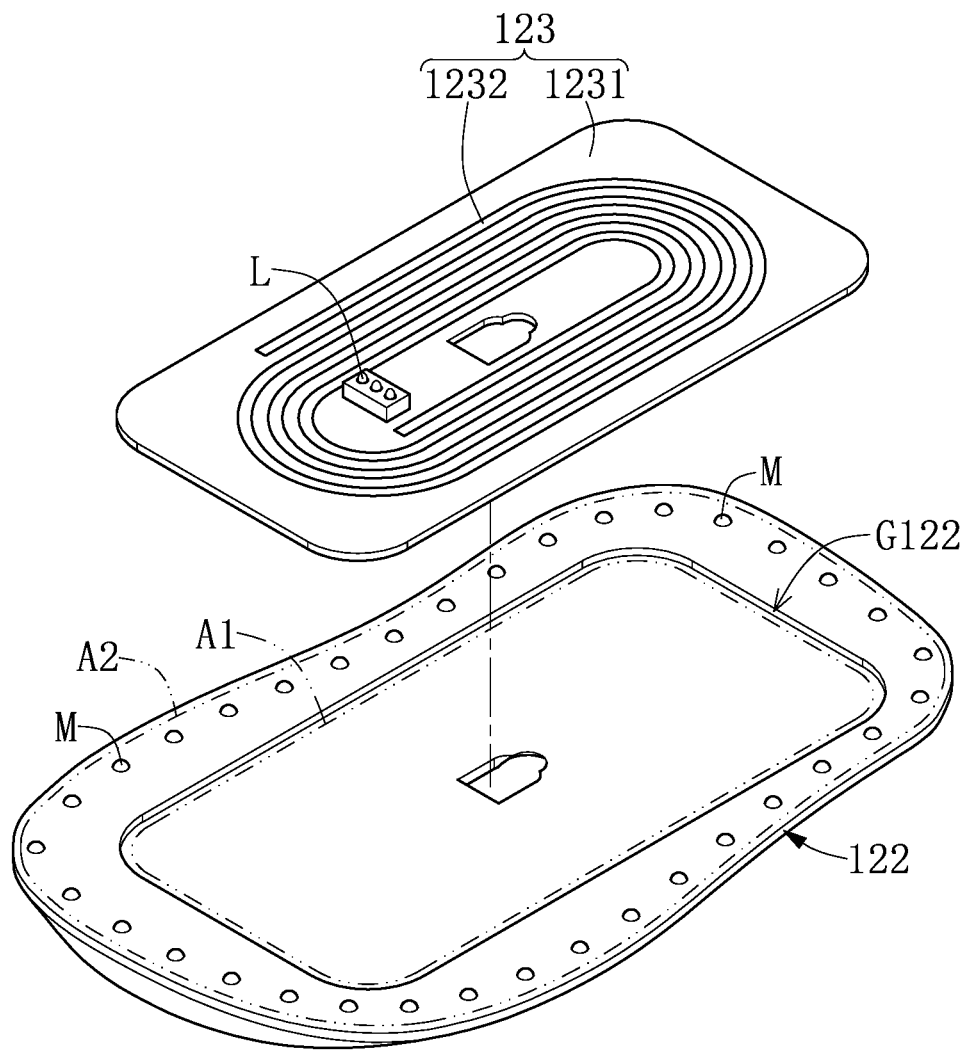
FIG. 9 is a schematic perspective view of a wireless charging assembly and a lower board according to the second embodiment of the present disclosure.
Figure 10:
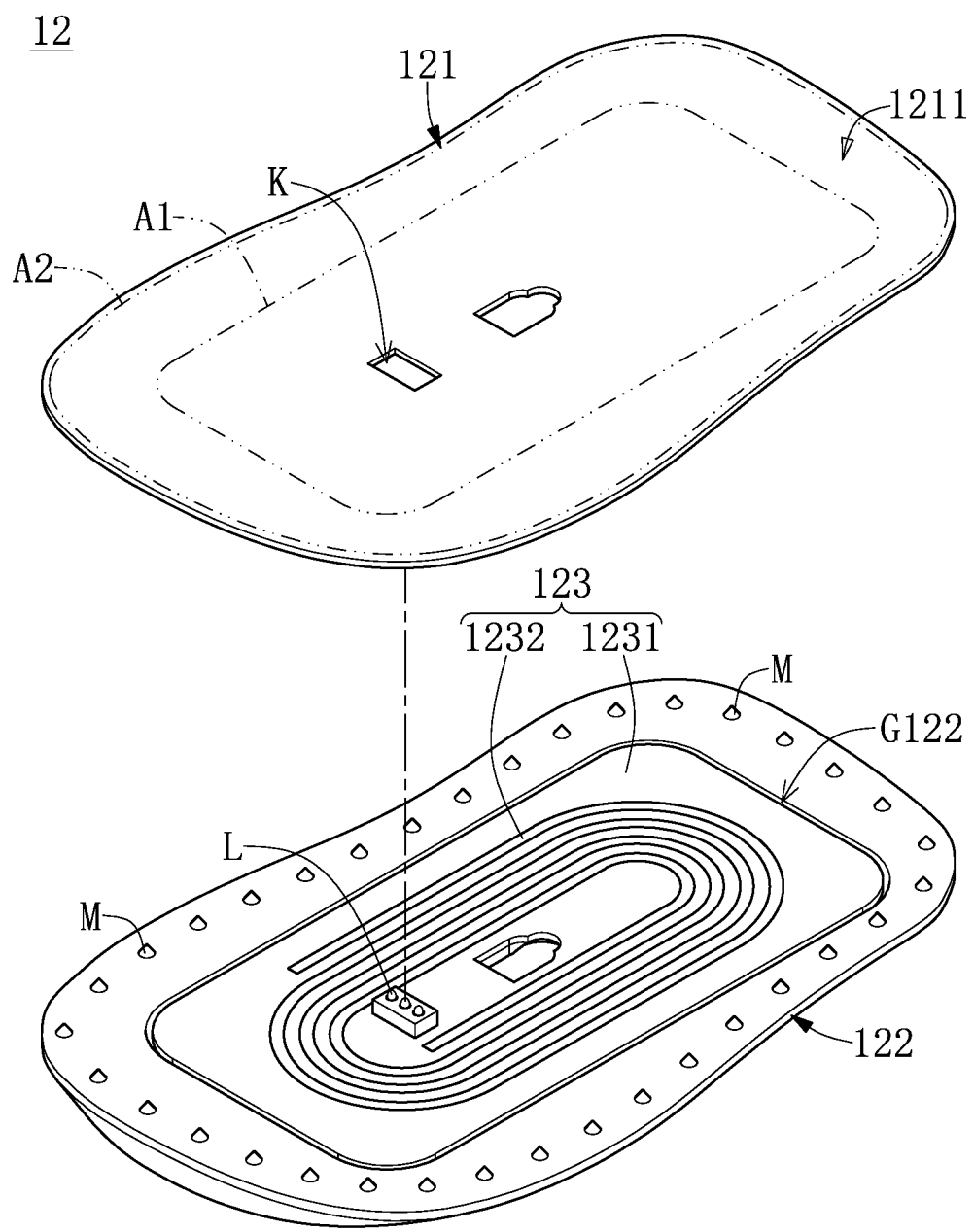
FIG. 10 is a schematic perspective view showing the wireless charging assembly and the lower board to be covered by the upper board according to the second embodiment of the present disclosure.

More specifically, as shown in FIG. 5 to FIG. 7, the lower shell 12 includes an upper board 121 and a lower board 122 that are fixed to each other, and a wireless charging assembly 123 that is disposed between the upper board 121 and the lower board 122. The upper board 121 and the lower board 122 each have an installation region A1 and a connection region A2 that surrounds the installation region A1. That is, the connection region A2 surrounds a periphery of the installation region A1 (as shown in FIG. 9 and FIG. 10). A side surface of the upper board 121 located in the connection region A2 thereof is fixed to a side surface of the lower board 122 located in the connection region A2 thereof by gluing or melting, so that a portion of the upper board 121 located in the installation region A1 thereof and a portion of the lower board 122 located in the installation region A1 thereof jointly form an installation space S12 for accommodating the wireless charging assembly 123.

In a practical application, the upper board 121 and the lower board 122 are fixed to each other by ultrasonic melting or coating of adhesives in their respective connection regions A2. As shown in FIG. 5 to FIG. 7, the lower board 122 has an accommodating groove G122 in the installation region A1 thereof. A depth of the accommodating groove G122 is preferably greater than or equal to a thickness of the wireless charging assembly 123, so that the wireless charging assembly 123 can be accommodated in the accommodating groove G122, and is just in contact with or is not in contact with the upper board 121. In other words, when the upper board 121 and the lower board 122 are fixed to each other, the wireless charging assembly 123 can be clamped by the lower board 122 and the upper board 121 at the same time, and movement of the wireless charging assembly 123 is restricted. Alternatively, the wireless charging assembly 123 can be supported by the lower board 122, and is capable of moving (slightly) in the accommodating groove G122.

Naturally, in certain embodiments of the present disclosure (not shown), the depth of the accommodating groove G122 can also be less than the thickness of the wireless charging assembly 123. That is, a top surface of the wireless charging assembly 123 in the accommodating groove G122 is higher than a side surface of the lower board 122 facing the upper board 121, and the wireless charging assembly 123 can slightly prop up the upper board 121 and the lower board 122.

In addition, in a practical application where the upper board 121 and the lower board 122 are fixed to each other by gluing, the upper board 121 and the lower board 122 can also be coated with adhesives (or be arranged with adhesive strips) on side surfaces of their respective installation regions A1, so that the side surface of the upper board 121 located in the installation region A1 thereof and the side surface of the lower board 122 located in the installation region A1 thereof can be fixed two opposite sides of the wireless charging assembly 123 by gluing. Accordingly, the movement of the wireless charging assembly 123 can be restricted.

Preferably, as shown in FIG. 7, a side wall of the accommodating groove G122 is not in contact with an outer edge of the wireless charging assembly 123, and a shortest distance D1 is defined between the outer edge of the wireless charging assembly 123 and the side wall of the accommodating groove G122. The shortest distance D1 is within a range from 0.1 mm to 0.2 mm, so as to prevent the wireless charging assembly 123 from being damaged due to the process of melting or gluing the upper board 121 and the lower board 122 (e.g., ultrasonic vibration or tape cutting).

It should be noted that the upper board 121 and the lower board 122 that are fixed by gluing or melting cannot be separated, so that the upper board 121, the lower board 122, and the wireless charging assembly 123 (i.e., the lower shell 12) are integrally formed as a single one-piece structure. In addition, when the lower shell 12 is fixed onto the upper shell 11, a side surface of the upper board 121 away from the lower board 122 is located in the accommodating space S1 and can be used to carry the electronic module 13.

As shown in FIG. 5 to FIG. 7, the upper board 121 of the lower shell 12 has a connection hole K in spatial communication with the installation space S12 and the accommodating space Si. That is, the connection hole K is located in the installation region A1 of the upper board 121. Accordingly, the connection hole K can allow the structure of the wireless charging assembly 123 to partially pass through, so as to establish an electrical coupling with the electronic module 13 (as shown in FIG. 5).

In a practical application, an area occupied by the connection hole K on a connection side surface 1211 of the upper board 121 facing the electronic module 13 (not including holes for light from the optical track sensor to pass through) is less than or equal to 10×5 $mm^2$ (i.e., 50 $mm^2$) In this way, the lower shell 12 is almost a closed structure, and thus has a better service life (e.g., preventing dust and liquid from affecting the wireless charging assembly 123). The aforementioned "almost closed structure" means that an area of all holes that are in spatial communication with an inside of the lower shell 12 (i.e., the installation space S12) is less than 50 $mm^2$.

Figure 4:
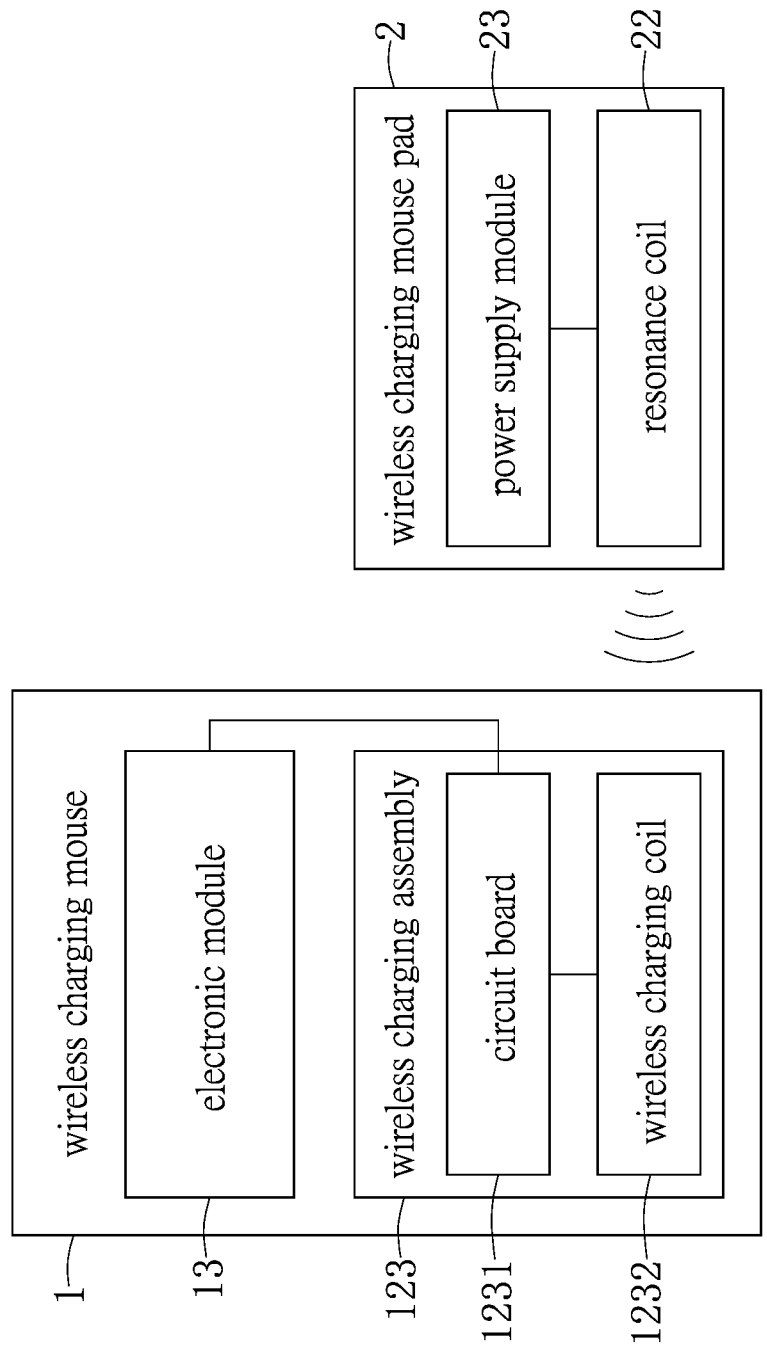
FIG. 4 is a schematic circuit diagram of the wireless charging mouse device according to the first embodiment of the present disclosure.

As shown in FIG. 4, FIG. 6, and FIG. 7, the wireless charging assembly 123 includes a circuit board 1231 and a wireless charging coil 1232 that is electrically coupled to the circuit board 1231. The wireless charging coil 1232 can be electromagnetically coupled to the wireless charging mouse 1, and the circuit board 1231 can be used to control parameters (e.g., an output current and an output voltage) of the wireless charging coil 1232 during an electromagnetic coupling.

In a practical application, an area of the circuit board 1231 is preferably greater than an area of the wireless charging coil 1232, and is less than or equal to an area of a bottom portion of the accommodating groove G122 of the lower board 122. The wireless charging coil 1232 is a ring structure, and is arranged on the circuit board 1231. A shortest distance D2 is defined between an outer edge of the wireless charging coil 1232 and an outer edge of the circuit board 1231 (as shown in FIG. 7), and the shortest distance D2 is preferably within a range from 1 mm to 2 mm, so as to prevent the wireless charging coil 1232 from being damaged during the melting process of the upper board 121 and the lower board 122 (e.g., fracture).

In addition, in the present embodiment, the circuit board 1231 further has a connection structure L (e.g., pin). The connection structure L can be exposed from the upper board 121 by passing through the connection hole K, so as to be electrically coupled to the electronic module 13. Accordingly, the electronic module 13 can be supplied with power through electrical energy that is converted from electromagnetic energy received from the wireless charging coil 1232.

In a practical application, a region defined by orthogonally projecting the connection hole K onto the lower board 122 is preferably located in a region defined by orthogonally projecting the circuit board 1231 onto the lower board 122. In other words, in a top view of the lower board 122, a position of the connection hole K is on the circuit board 1231, so that the connection structure L of the circuit board 1231 can directly pass through the connection hole K.

As shown in FIG. 1 and FIG. 4, the wireless charging mouse pad 2 can be electromagnetically coupled to the wireless charging mouse 1, so as to provide the electrical energy for the wireless charging mouse 1. The wireless charging mouse pad 2 in the present embodiment includes a main body 21, a resonance coil 22 disposed in the main body 21, and a power supply module 23 that is electrically coupled to the resonance coil 22.

The power supply module 23 can be electrically coupled to an external power source (e.g., utility power), so as to convert said power source into a voltage and a current required by each internal component of the wireless charging mouse device 100. In practical use, according to actual requirements, the power supply module 23 can have circuits and components related to voltage transformation, rectification, filtering, etc. The resonance coil 22 can convert electrical energy provided by the power supply module 23 into electromagnetic energy, which is then transmitted to the wireless charging coil 1232. The electronic module 13 can convert the electromagnetic energy into electrical energy through the wireless charging coil 1232, so as to be supplied with power. In other words, the wireless charging coil 1232 in the present embodiment is a receiving resonance coil.

It should be noted that, since how the wireless charging mouse pad 2 converts the electrical energy into the electromagnetic energy and how the wireless charging mouse 1 converts the electromagnetic energy into the electrical energy are known to those skilled in the art and are not the focus of the present disclosure, details thereof will not be described herein.

In practice, the lower shell 12 of the wireless charging mouse 1 can be an independent component that allows for replacement or sale, so that power supply-related components of the wireless charging mouse 1 can be quickly repaired. For example, when the wireless charging assembly 123 is burnt out, the lower board 122 is damaged, or the wireless charging assembly 123 is exposed, a user can make repairs by replacing the lower shell 12. In other words, the lower shell 12 can be independently used (e.g., implemented, manufactured, or sold) or can be used in cooperation with other components.

Second Embodiment

Figure 8:
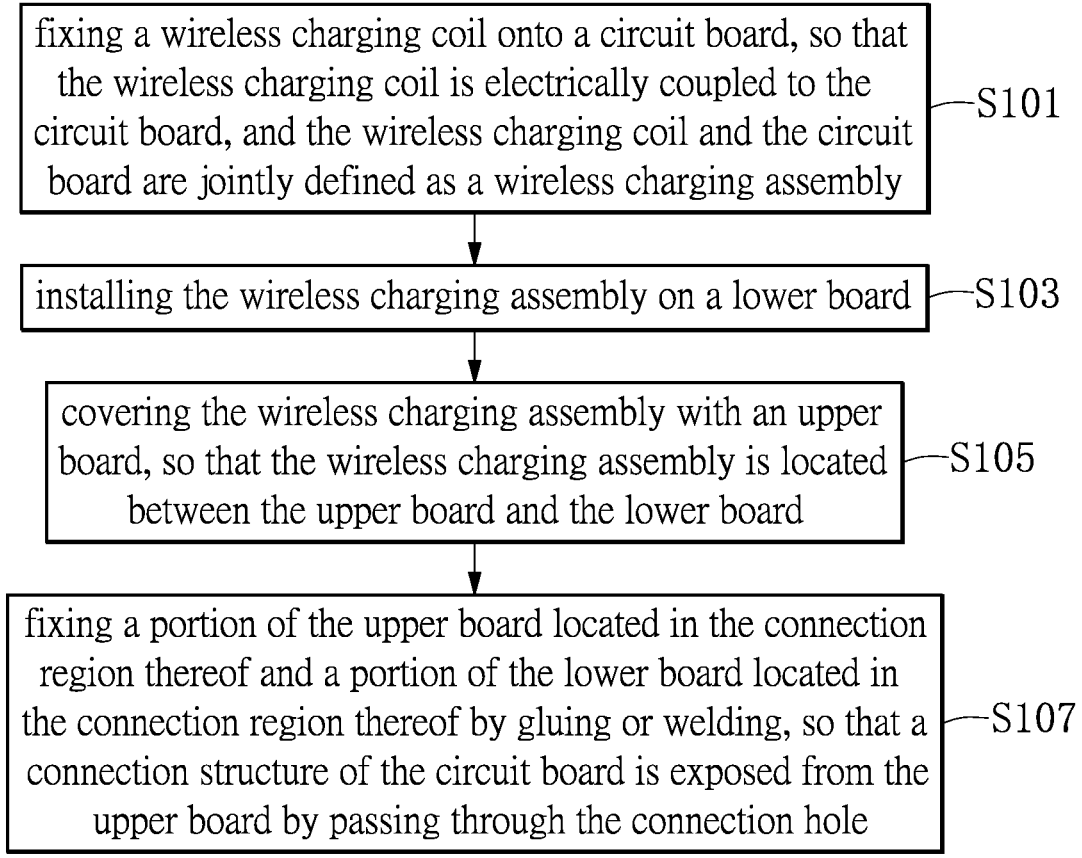
FIG. 8 is a flowchart of a method for producing the lower shell according to a second embodiment of the present disclosure.

Referring to FIG. 8 to FIG. 11, a second embodiment of the present disclosure provides a method for producing a lower shell of a wireless charging mouse. That is, the lower shell 12 of the first embodiment is produced by said method. Therefore, reference can be made to the descriptions and drawings (i.e., FIG. 1 to FIG. 7) of the first embodiment in due course. As shown in FIG. 8, the method can be applied to a production line (e.g., a production line of the wireless charging mouse), and the method includes step S101 to step S107. However, in a practical application, any one of the above steps can be omitted or replaced by a designer.

A first fixing step S101 is implemented, which includes: fixing a wireless charging coil 1232 on a circuit board 1231, so that the wireless charging coil 1232 is electrically coupled to the circuit board 1231 (as shown in FIG. 9). The wireless charging coil 1232 and the circuit board 1231 are jointly defined as a wireless charging assembly 123, and the wireless charging coil 1232 is located in a region of the circuit board 1231.

In other words, an area of the circuit board 1231 is larger than an area of the wireless charging coil 1232, and a shortest distance D2 is defined between an outer edge of the wireless charging coil 1232 and an outer edge of the circuit board 1231 is preferably within a range from 1 mm to 2 mm (as shown in FIG. 7).

An installation step S103 is implemented, which includes: installing the wireless charging assembly 123 on a lower board 122 (as shown in FIG. 9). The lower board 122 has an installation region A1 and a connection region A2 that surrounds the installation region A1, and the wireless charging assembly 123 is located in the installation region A1 of the lower board 122.

Figure 11:
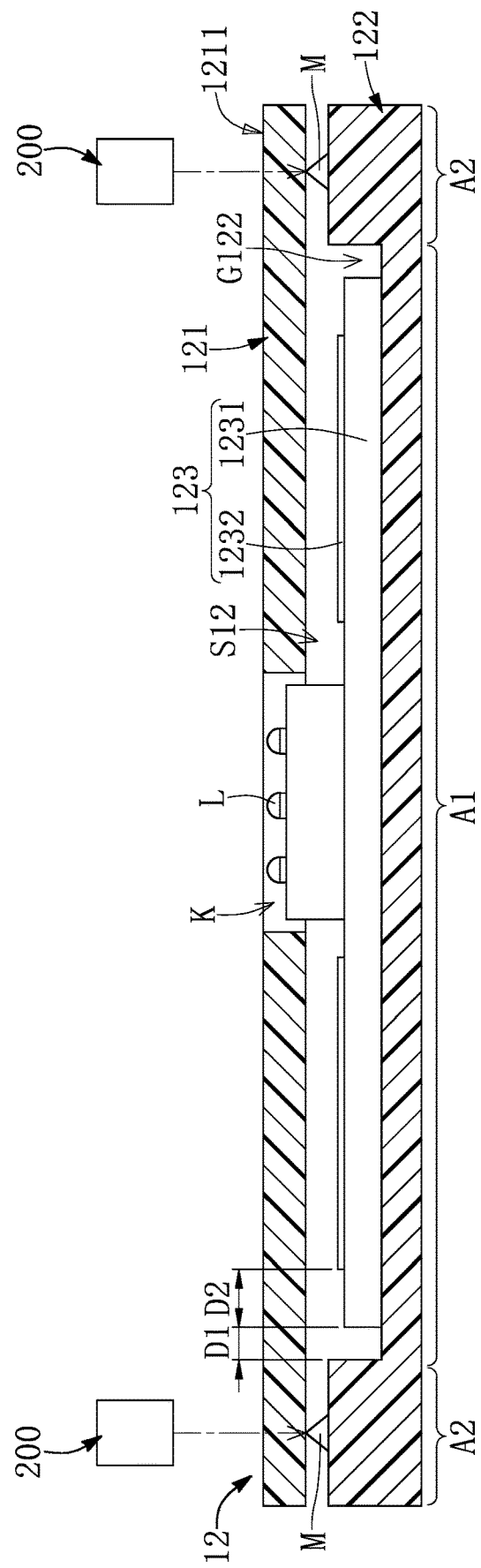
FIG. 11 is a schematic perspective view showing a protruding portion to be melted by ultrasonic vibration according to the second embodiment of the present disclosure.

In a practical application, as shown in FIG. 9 and FIG. 11, the lower board 122 has an accommodating groove G122 in the installation region A1 thereof, and the accommodating groove G122 can be used to accommodate the wireless charging assembly 123. Preferably, a side wall of the accommodating groove G122 is not in contact with an outer edge of the wireless charging assembly 123, so that the outer edge of the wireless charging assembly 123 and the side wall of the accommodating groove G122 have a shortest distance D1 there-between (as shown in FIG. 7). The shortest distance D1 is within a range from 0.1 mm to 0.2 mm, but the present disclosure is not limited thereto.

For example, in another embodiment of the present disclosure (not shown), a volume of the accommodating groove G122 can also be substantially equal to a volume of the wireless charging assembly 123, so that the wireless charging assembly 123 fills a space of the accommodating groove G122. In other words, the side wall of the accommodating groove G122 is in contact with the outer edge of the wireless charging assembly 123.

A cover step S105 is implemented, which includes: covering the wireless charging assembly 123 with an upper board 121, so that the wireless charging assembly 123 is located between the upper board 121 and the lower board 122 (as shown in FIG. 11).

In detail, as shown in FIG. 9 and FIG. 10, the upper board 121 has an installation region A1 and a connection region A2 that surrounds the installation region A1. The installation region A1 and the connection region A2 of the upper board 121 substantially correspond in area to the installation region A1 and the connection region A2 of the lower board 122.

When the upper board 121 is disposed onto the lower board 122 and covers the wireless charging assembly 123, the installation region A1 of the upper board 121 corresponds in position to the installation region A1 of the lower board 122, and the connection region A2 of the upper board 121 corresponds in position to the connection region A2 of the lower board 122.

In addition, as shown in FIG. 11, the upper board 121 has a connection hole K corresponding in position to the circuit board 1231. That is, the connection hole K is located in the installation region A1 of the upper board 121.

A second fixing step S107 is implemented, which includes: fixing a portion of the upper board 121 located in the connection region A2 thereof and a portion of the lower board 122 located in the connection region A2 thereof by gluing or melting, so that a connection structure L of the circuit board 1231 is exposed from the upper board 121 by passing through the connection hole K and is electrically coupled to an electronic module (e.g., an optical track sensor).

More specifically, as shown in FIG. 10 and FIG. 11, in a practical application where ultrasonic melting is performed, a side surface of one of the upper board 121 and the lower board 122 facing another one of the upper board 121 and the lower board 122 has a protruding portion M (multiple ones of the protruding portion M are illustrated in the drawings). The protruding portion M is preferably located on the upper board 121 or the lower board 122, and is adjacent to an outer edge of the wireless charging assembly 123. The protruding portion M can be melted by ultrasonic vibration, so that the upper board 121 and the lower board 122 are fixed to each other. Two blocks on both sides of the upper board 121 shown in FIG. 11 are each an ultrasonic melting mechanism 200.

Moreover, the present embodiment is exemplified by the lower board 122 having the protruding portion M (that is, the side surface of the lower board 122 facing the upper board 121 has the protruding portion M), but the present disclosure is not limited thereto. For example, in another embodiment of the present disclosure (not shown), the upper board 121 can also have the protruding portion M.

In more detail, the protruding portion M in the present embodiment is a tapered structure protruding from the lower board 122 toward the upper board 121, a height of the protruding portion M is within a range from 0.35 mm to 0.45 mm, and a width of the protruding portion M is within a range from 0.35 mm to 0.45 mm Therefore, when the protruding portion M is melted by the ultrasonic vibration, the lower board 122 and the upper plate board 121 have ideal manufacturing reliability.

Figure 12:
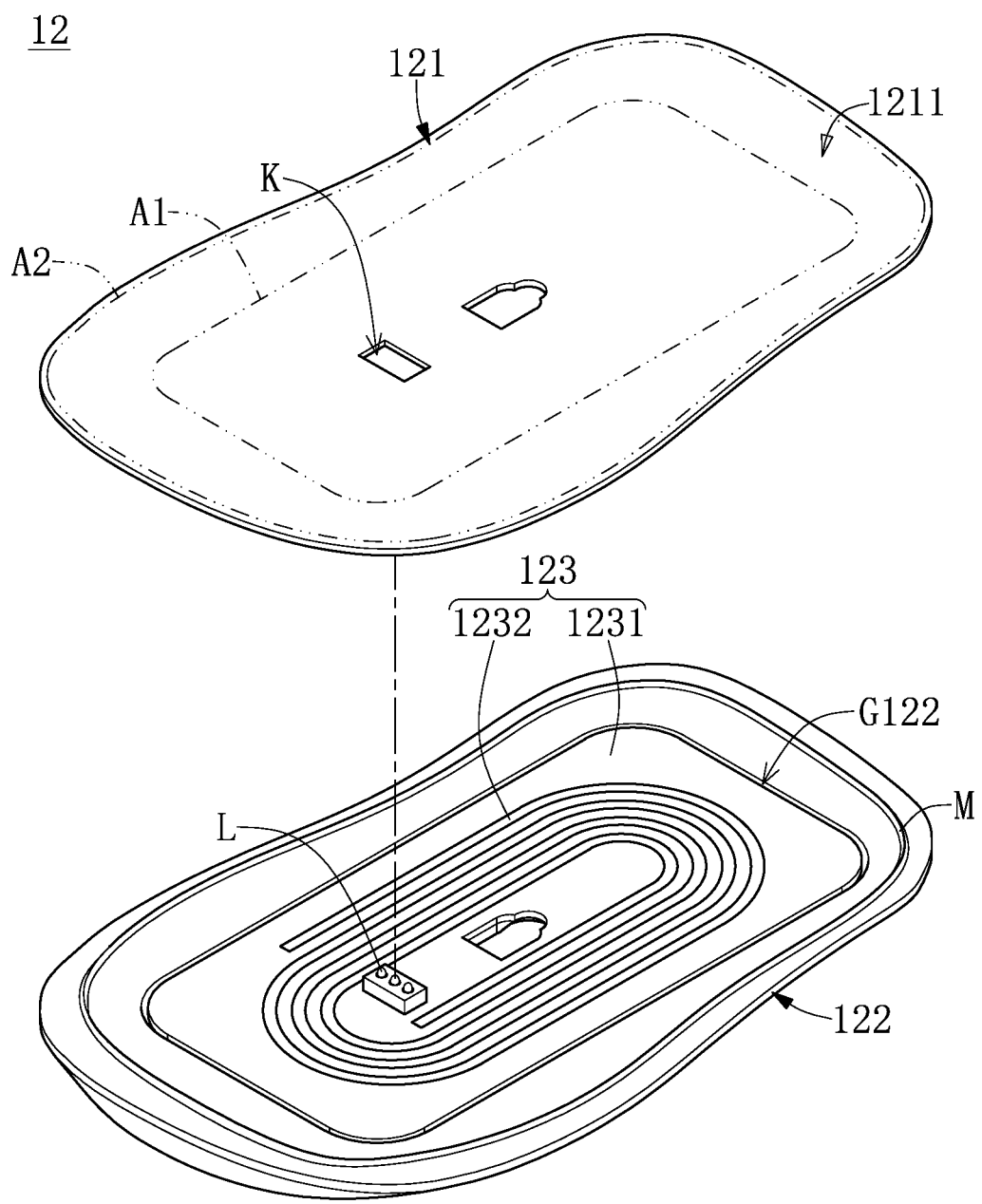
FIG. 12 is a schematic perspective view showing the wireless charging assembly and another configuration of the lower board to be covered by the upper board according to the second embodiment of the present disclosure.
Figure 13:
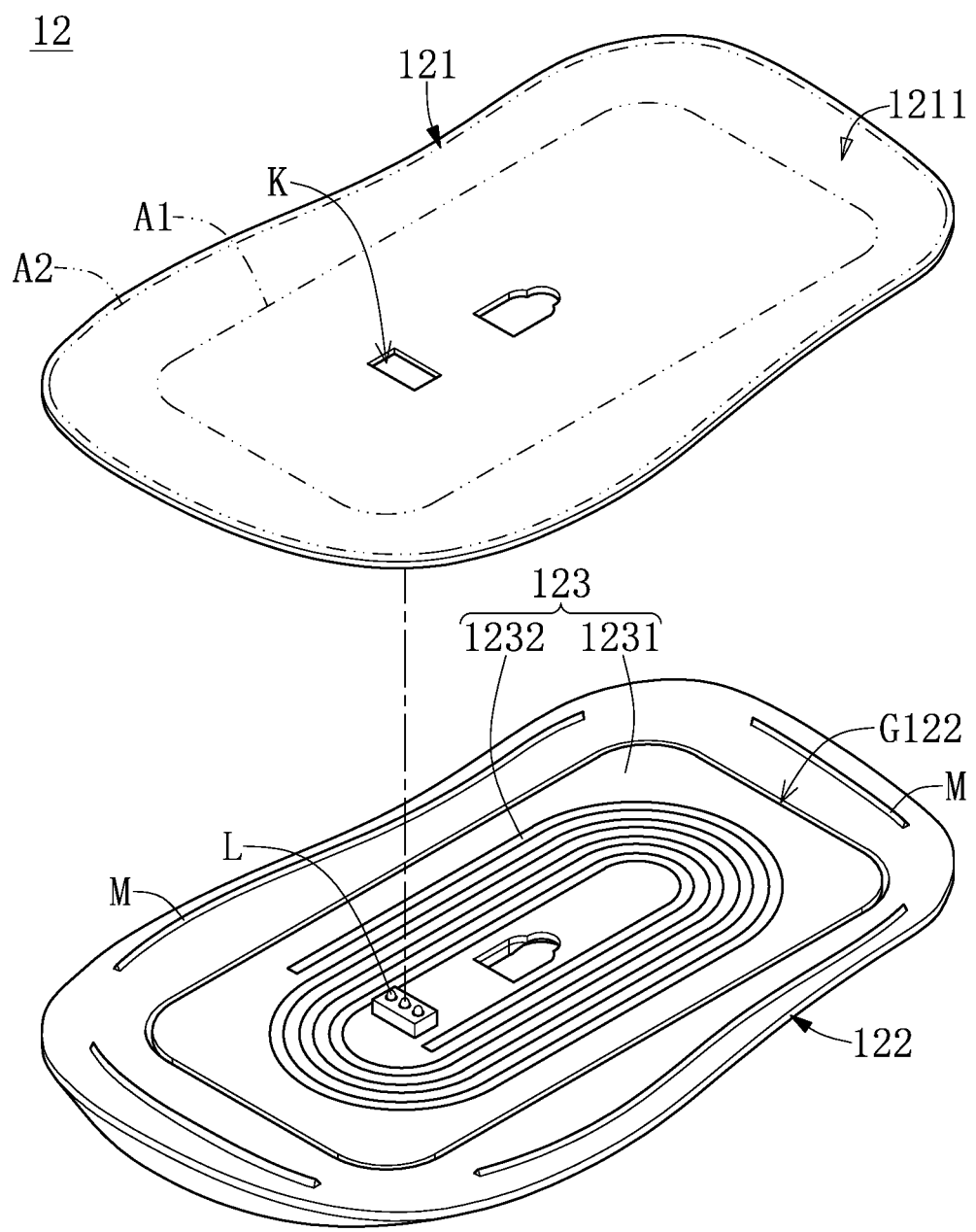
FIG. 13 is a schematic perspective view showing the wireless charging assembly and yet another configuration of the lower board to be covered by the upper board according to the second embodiment of the present disclosure.

It should be noted that, in the present embodiment, the protruding portions M shown in the drawings are each an independent bump (i.e., non-continuous), but the present disclosure is not limited thereto. For example, in another embodiment of the present disclosure (as shown in FIG. 12 and FIG. 13), the lower shell 12 can have one protruding portion M that is an annular rib, or numerous protruding portions M that are elongated ribs. A width of a cross section (or a bottom portion) of the annular rib or each of the elongated ribs is within a range from 0.35 mm to 0.45 mm, and a height of the cross section (or the bottom portion) of the annular rib or each of the elongated ribs is within a range from 0.35 mm to 0.45 mm.

In a practical application where gluing is performed, a portion of the lower board 122 in the connection region A2 thereof and a portion of the upper board 121 in the connection region A2 thereof can be fixed to each other by having a glue liquid (e.g., an adhesive agent) or a glue element (e.g., a double-sided tape) disposed there-between. Naturally, in situations where gluing is performed, a portion of the lower board 122 in the installation region A1 thereof and a portion of the upper board 121 in the installation region A1 thereof can also be fixed to each other by having the above-mentioned glue liquid or glue element disposed there-between, so that the two opposite sides of the wireless charging assembly 123 can be fixed by the lower plate 122 and the upper plate 121. In addition, in a practical application, the protruding portion M can also be omitted (as shown in FIG. 7).

Moreover, in certain embodiments of the present disclosure (not shown), the accommodating groove G122 can also be omitted from the lower board 122. When the lower board 122 and the upper board 121 are fixed to each other, the lower board 122 and the upper board 121 can clamp the wireless charging assembly 123, and the wireless charging assembly 123 can (slightly) prop up the lower board 122 and the upper board 121.

It should be noted that, in an exemplary embodiment, a thickness of each of the upper board 121 and the lower board 122 is preferably within a range from 0.8 mm to 1.6 mm, which allows the upper board 121 and the lower board 122 to have an ideal structural strength. In addition, whether the circuit board 1231 adopts a fiberglass board (FR-4) or a flexible printed circuit board (FPC), a final product (i.e., the lower shell 12) is configured to not occupy an internal space of the wireless charging mouse 1.

In more detail, when the circuit board 1231 is the fiberglass board, a thickness of the lower shell 12 is substantially within a range from 1.8 mm to 2.6 mm. Moreover, when the circuit board 1231 is the flexible printed circuit board, a thickness of the lower shell 12 is substantially within a range from 1.8 mm to 2.2 mm. It can be seen from the foregoing descriptions that the thickness of the lower shell 12 is less than or equal to 2.6 mm, which allows a space jointly formed by the lower shell 12 and the upper shell 11 (i.e., the accommodating space S1 in the first embodiment) to be effectively used.

It should be noted that, although the flexible printed circuit board has lighter and thinner structural characteristics compared to the fiberglass board, since the lower shell is conventionally produced by a plastic injection process, the circuit board in the lower shell of the wireless charging mouse is unable to adopt the flexible printed circuit board. This is because the flexible printed circuit board cannot be used in a high temperature and high pressure environment during the plastic injection process. In other words, the method for producing the lower shell provided in the present disclosure solves the problem of not being able to use the flexible printed circuit board in a conventional approach.

Further, in the method of the present disclosure, the lower shell can have a lighter and thinner structure, especially for the lower shell that is configured to use the flexible printed circuit board.

[Beneficial Effects of the Embodiments]

In conclusion, in the wireless charging mouse device, the wireless charging mouse, the lower shell of the wireless charging mouse, and the method for producing the lower shell provided by the present disclosure, by virtue of "the side surface of the upper board located in the connection region thereof being fixed to the side surface of the lower board located in the connection region thereof by gluing or melting, so that the portion of the upper board located in the installation region thereof and the portion of the lower board located in the installation region thereof jointly form the installation space" and "the wireless charging assembly being disposed in the installation space and being exposed from the upper board by passing through the connection hole, so as to be electrically coupled to the electronic module," the lower shell is so configured as to allow the production yield to be effectively increased and the production cost to be effectively reduced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A wireless charging mouse, comprising:
    an upper shell;
    an electronic module; and
    a lower shell, wherein the lower shell is detachably disposed on the upper shell, so that the lower shell and the upper shell jointly form an accommodating space, wherein the electronic module is located in the accommodating space, and wherein the lower shell includes:
    an upper board and a lower board each having an installation region and a connection region that surrounds the installation region, wherein a side surface of the upper board located in the connection region thereof is fixed to a side surface of the lower board located in the connection region thereof by gluing or melting, so that a portion of the upper board located in the installation region thereof and a portion of the lower board located in the installation region thereof jointly form an installation space, and wherein the upper board is configured to carry the electronic module, and has a connection hole that is in spatial communication with the installation space and the accommodating space; and
    a wireless charging assembly disposed in the installation space, wherein the wireless charging assembly includes a circuit board and a wireless charging coil that is electrically coupled to the circuit board, and wherein a connection structure of the circuit board is exposed from the upper board by passing through the connection hole, so as to be electrically coupled to the electronic module.

2. The wireless charging mouse according to claim 1, wherein a position of a region defined by orthogonally projecting the connection hole onto the lower board is located in a region defined by orthogonally projecting the circuit board onto the lower board.

3. The wireless charging mouse according to claim 1, wherein an area of the circuit board is greater than an area of the wireless charging coil, a shortest distance is defined between an outer edge of the wireless charging coil and an outer edge of the circuit board, and the shortest distance is within a range from 1 mm to 2 mm.

4. The wireless charging mouse according to claim 1, wherein an area occupied by the connection hole on a connection side surface of the upper board facing the electronic module is less than or equal to 50 $mm^2$.

5. The wireless charging mouse according to claim 1, wherein a side surface of the upper board located in the installation region thereof and a side surface of the lower board located in the installation region thereof are fixed to two opposite sides of the wireless charging assembly by gluing.

6. The wireless charging mouse according to claim 1, wherein the wireless charging coil is a receiving resonance coil; wherein the wireless charging coil is configured to be electromagnetically coupled to a resonance coil of a wireless charging mouse pad, so that the electronic module is configured to be supplied with power through electrical energy that is converted from electromagnetic energy received from the wireless charging coil.

7. The wireless charging mouse according to claim 1, wherein the lower board has an accommodating groove in the installation region thereof, and the wireless charging assembly is disposed in the accommodating groove;
    wherein a shortest distance is defined between an outer edge of the wireless charging assembly and a side wall of the accommodating groove, and the shortest distance is within a range from 0.1 mm to 0.2 mm.

8. A method for producing a lower shell of a wireless charging mouse, which is applicable to a production line, the method comprising:
    implementing a first fixing step which includes: fixing a wireless charging coil onto a circuit board, so that the wireless charging coil is electrically coupled to the circuit board; wherein the wireless charging coil and the circuit board are jointly defined as a wireless charging assembly;
    implementing an installation step which includes: installing the wireless charging assembly on a lower board; wherein the lower board has an installation region and a connection region that surrounds the installation region, and the wireless charging assembly is located in the installation region of the lower board;
    implementing a cover step which includes: covering the wireless charging assembly with an upper board, so that the wireless charging assembly is located between the upper board and the lower board;
    wherein the upper board has an installation region and a connection region that surrounds the installation region; wherein the installation region of the upper board corresponds in position to the installation region of the lower board, and the connection region of the upper board corresponds in position to the connection region of the lower board;
    wherein the upper board has a connection hole corresponding in position to the circuit board; and
    implementing a second fixing step which includes: fixing a portion of the upper board located in the connection region thereof and a portion of the lower board located in the connection region thereof by gluing or melting, so that a connection structure of the circuit board is exposed from the upper board by passing through the connection hole.

9. The method according to claim 8, wherein a side surface of one of the upper board and the lower board facing another one of the upper board and the lower board has a protruding portion, and the protruding portion is configured to be melted by ultrasonic vibration, so that the upper board and the lower board are capable of being fixed to each other.

10. The method according to claim 9, wherein the protruding portion is located on the upper board or the lower board, and is adjacent to an outer edge of the wireless charging assembly.

11. The method according to claim 9, wherein a height of the protruding portion is within a range from 0.35 mm to 0.45 mm, and a width of the protruding portion is within a range from 0.35 mm to 0.45 mm.

12. The method according to claim 8, wherein, in the installation step, the lower board has an accommodating groove, and the wireless charging assembly is disposed in the accommodating groove; wherein a shortest distance is defined between an outer edge of the wireless charging assembly and a side wall of the accommodating groove, and the shortest distance is within a range from 0.1 mm to 0.2 mm.

13. The method according to claim 8, wherein, in the first fixing step, an area of the circuit board is greater than an area of the wireless charging coil, a shortest distance is defined between an outer edge of the wireless charging coil and an outer edge of the circuit board, and the shortest distance is within a range from 1 mm to 2 mm.

14. The method according to claim 8, wherein the circuit board is a fiberglass board, and a thickness of the lower shell is within a range from 1.8 mm to 2.6 mm.

15. The method according to claim 8, wherein the circuit board is a flexible printed circuit board, and a thickness of the lower shell is within a range from 1.8 mm to 2.2 mm.

16. The method according to claim 8, wherein a thickness of each of the upper board and the lower board is within a range from 0.8 mm to 1.6 mm.

17. A lower shell of a wireless charging mouse produced by the method as claimed in claim 8.

18. A wireless charging mouse, comprising an upper shell, an electronic module, and a lower shell that is produced by the method as claimed in claim 8.

19. A wireless charging mouse device, comprising:
a wireless charging mouse including:
an upper shell;
an electronic module; and
a lower shell, wherein the lower shell is detachably disposed on the upper shell, so that the lower shell and the upper shell jointly form an accommodating space, wherein the electronic module is located in the accommodating space, and wherein the lower shell includes:
an upper board and a lower board each having an installation region and a connection region that surrounds the installation region, wherein a side surface of the upper board located in the connection region thereof is fixed to a side surface of the lower board located in the connection region thereof by gluing or melting, so that a portion of the upper board located in the installation region thereof and a portion of the lower board located in the installation region thereof jointly form an installation space, and wherein the upper board is configured to carry the electronic module, and has a connection hole in spatial communication with the installation space and the accommodating space; and
a wireless charging assembly disposed in the installation space, wherein the wireless charging assembly includes a circuit board and a wireless charging coil that is electrically coupled to the circuit board, and wherein a connection structure of the circuit board is exposed from the upper board by passing through the connection hole, so as to be electrically coupled to the electronic module; and
a wireless charging mouse pad, wherein the wireless charging mouse pad is configured to be electromagnetically coupled to the wireless charging mouse, and the wireless charging mouse pad includes a resonance coil, and wherein the resonance coil is configured to be electromagnetically coupled to the wireless charging coil, so that the electronic module is configured to be supplied with power through electrical energy that is converted from electromagnetic energy received from the wireless charging coil.

\* \* \* \* \*